United States Patent [19]

Kopecky

[11] Patent Number: 4,638,748
[45] Date of Patent: Jan. 27, 1987

[54] APPLICATOR AND GRAIN DRILL SHANK

[75] Inventor: Ivyl D. Kopecky, Ypsilanti, N. Dak.

[73] Assignee: Haybuster Manufacturing, Inc., Jamestown, N. Dak.

[21] Appl. No.: 742,210

[22] Filed: Jun. 7, 1985

[51] Int. Cl.[4] ............................................. A01C 23/02
[52] U.S. Cl. ........................................ 111/7; 111/73; 111/80; 111/86
[58] Field of Search ..................... 111/6, 7, 52, 73, 80, 111/85, 86

[56] References Cited

U.S. PATENT DOCUMENTS

| 909,991 | 1/1909 | Cole | 111/73 |
|---|---|---|---|
| 1,473,247 | 11/1923 | Knight | 111/86 |
| 2,048,441 | 7/1936 | Feltman | 111/59 |
| 2,159,652 | 5/1939 | Brunner | 111/86 |
| 2,259,303 | 10/1941 | Everth | 111/85 |
| 2,874,656 | 2/1959 | Bennett | 111/7 |
| 2,889,788 | 6/1959 | Van Dorn | 111/80 |
| 2,924,189 | 2/1960 | McLeod | 111/80 |
| 3,122,111 | 2/1964 | Taylor | 111/80 |
| 3,188,988 | 6/1965 | Peck | 111/7 |
| 3,296,985 | 1/1967 | Shelton | 111/7 |
| 3,707,132 | 12/1972 | Hansen | 111/7 |
| 3,854,429 | 12/1974 | Blair | 111/7 |
| 4,278,036 | 7/1981 | Buchele | 111/73 |
| 4,388,878 | 6/1983 | Demzin | 111/73 |
| 4,417,530 | 11/1983 | Kopecky | 111/73 |

FOREIGN PATENT DOCUMENTS

| 244384 | 4/1963 | Australia | 111/73 |
|---|---|---|---|
| 2117135 | 10/1971 | Fed. Rep. of Germany | 111/80 |
| 35151 | 1/1965 | German Democratic Rep. | 111/7 |
| 516923 | 1/1940 | United Kingdom | 111/86 |
| 235434 | 5/1969 | U.S.S.R. | 111/7 |
| 441885 | 12/1974 | U.S.S.R. | 111/80 |
| 581901 | 11/1977 | U.S.S.R. | 111/85 |
| 906418 | 2/1982 | U.S.S.R. | 111/85 |
| 1058529 | 12/1983 | U.S.S.R. | 111/8 |
| 1097216 | 6/1984 | U.S.S.R. | 111/73 |

Primary Examiner—James R. Feyrer
Attorney, Agent, or Firm—Kinney & Lange

[57] ABSTRACT

A shank for use in a hoe-type drill designed primarily for minimum till or no-till farm operations has a sealing arrangement for permitting the application of anhydrous gas or other gaseous fertilizers in a deep application, and, at the same time, seeding and applying longer lasting fertilizer, such as granular or liquid fertilizers at different depths. The problems with applying gaseous type fertilizers at the same time other operations are occurring have been substantial because of unwanted escape of the gas prior to the closing of the furrow in a multiple operation; freezing up of the seed and granular fertilizer outlets as the gas evaporates; as well as permitting dry top soil to fall into the furrow to result in a dry seed bed, particularly in semi-arid farming regions where no-till farming is carried out. The present device provides for a multi-level sealing arrangement that insures adequately sealing of the gaseous fertilizer; proper furrow formation for receiving of other types of fertilizer and/or seed; and also forming the seed bed to minimize the dry soil that contacts the seed.

4 Claims, 5 Drawing Figures

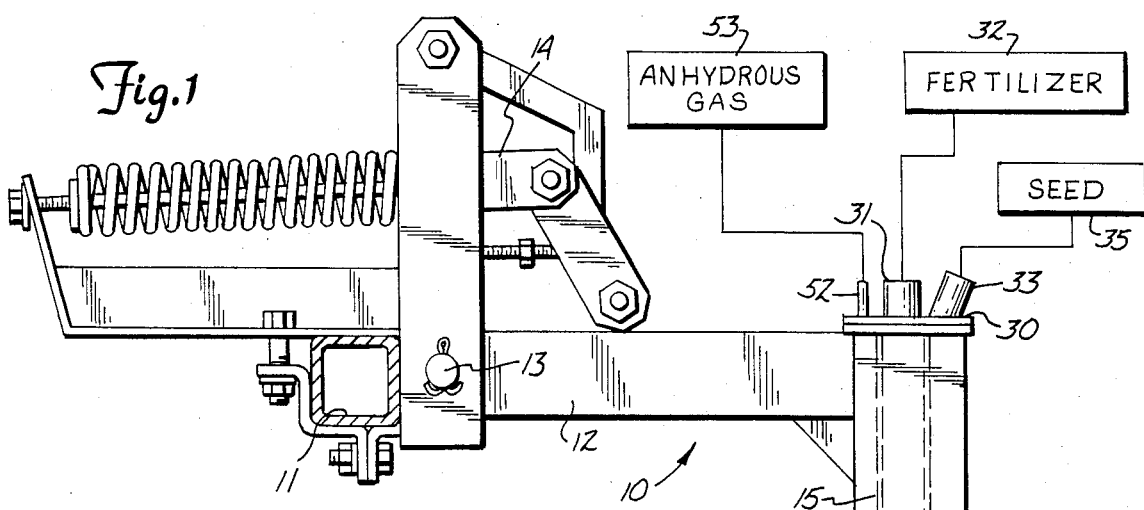
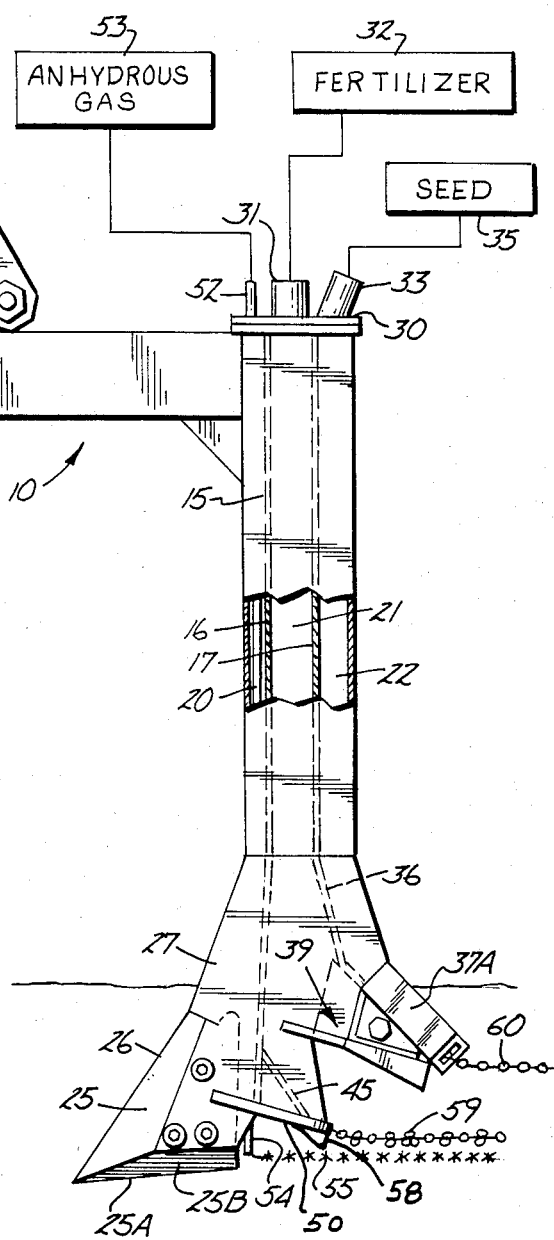
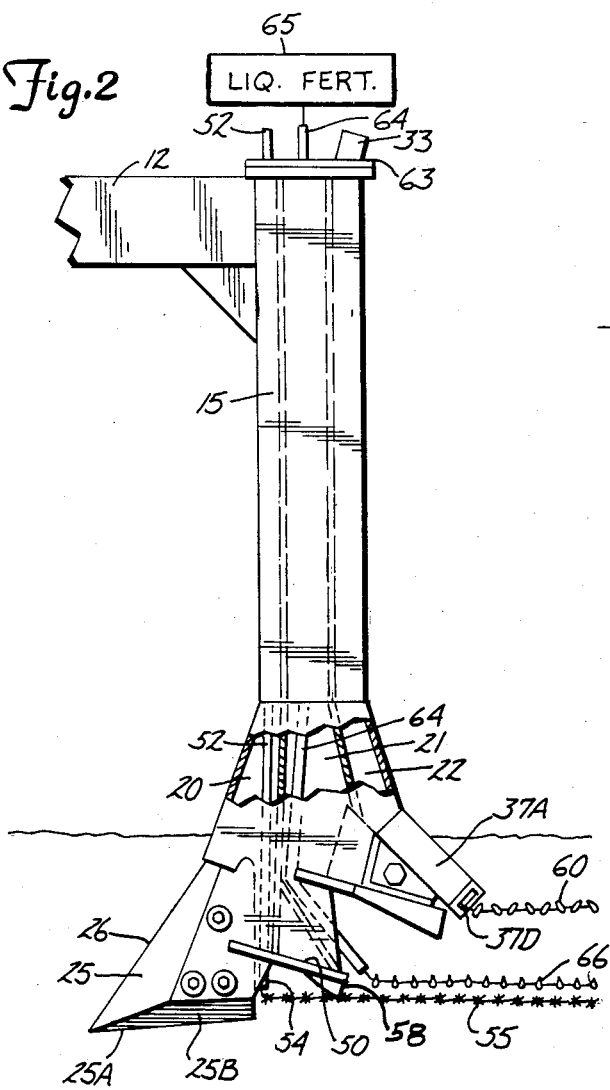
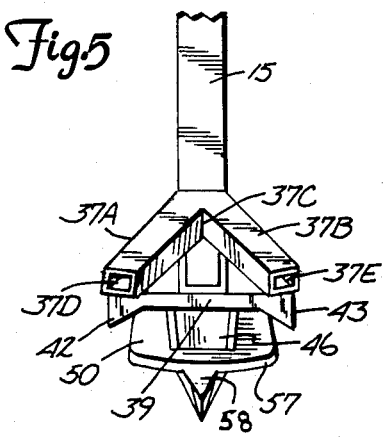

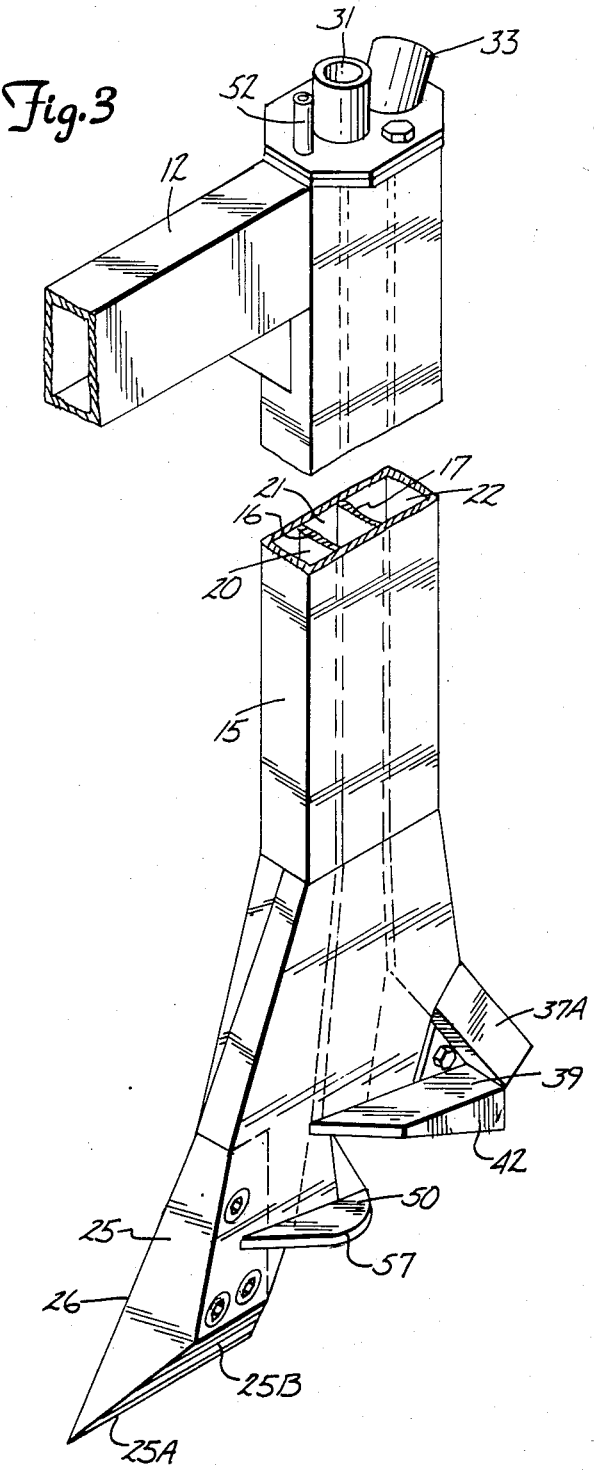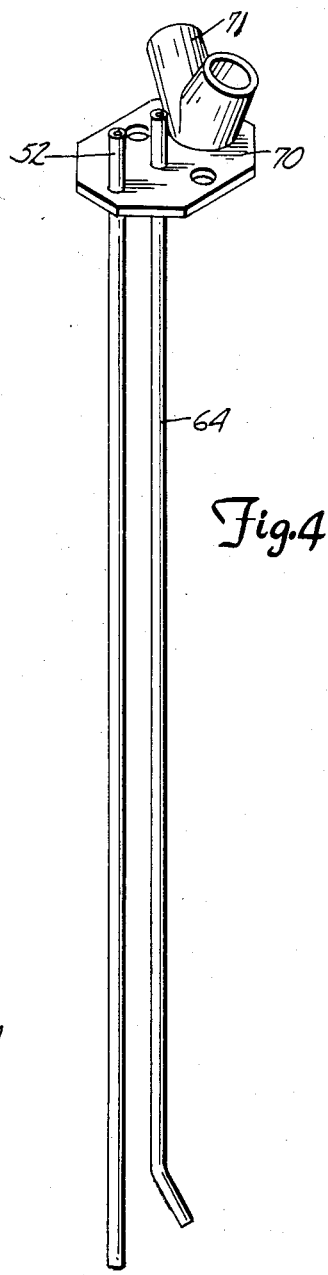

APPLICATOR AND GRAIN DRILL SHANK

CROSS REFERENCE TO RELATED APPLICATION

Reference is hereby made to U.S. patent application Ser. No. 563,198, filed Dec. 18, 1983, for "Seeding Apparatus with Fertlizer Applicator," and U.S. patent application Ser. No. 623,056, filed July 18, 1984, for "Furrow Opener for Seeder."

BACKGROUND OF THE INVENTION

1. Field of the Invention

The present invention relates to a shank for a fertlizer applicator and grain drill that has a provision for furrow openings including a deep banding opening for application of gaseous type fertilizer and other outlets for seed and/or liquid and granular type fertilizers.

2. Description of the Prior Art

Seed and fertilizer applicators are known at the present time. Furrow opener shanks that have been used in minimum tillage have been included in devices having two or more vertical passageways for applying seed and/or fertilizer (generally granular fertilizer) in a furrow. For example, U.S. Pat. No. 4,417,530 shows a planting apparatus having a shank wherein seed is deposited through a passageway, and fertilizer can be deposited through a second different passageway so that the seed and fertilizer are deposited at two different depths.

Further, there have been shanks which have been used for attemping to put on gaseous type fertilizer as well as seed in a single pass. A typical shank of this type is shown in the above-identified U.S. patent application Ser. No. 632,056, filed July 18, 1984.

U.S. Pat. Nos. 2,889,788 and 2,048,441 also show furrow opener assemblies where there are two separate tubes for depositing material at different levels in the same furrow.

However, the problems associated with deep banding anhydrous gas are substantially increased over the problems associated with depositing ordinary granular or liquid fertilizer. The present device provides for a single pass shank that permits the application of materials, such as anhydrous gas, or other gaseous fertilizers, as well as permitting the application of granular fertilizers and seed in the same pass of the shank.

SUMMARY OF THE INVENTION

The present invention relates to a furrow opener shank for an applicator or grain drill which provides three separate outlet levels for outlet of fertilizer and seed and includes, in particular, a deep penetrating outlet with a sealer plate directly above the outlet to permit the insertion of gaseous fertilizer at a very low level and immediately sealing this fertilizer with a plate. A granular fertilizer or liquid fertilizer are deposited at a level above the sealing plate, which leaves a layer of smothered dirt. The outlet for applying granular fertilizer and liquid fertilizer is below a second sealing plate and seed bed forming plate that covers in the fertilizer completely and forms a firm seed bed, as well as providing small furrows that are formed by the second sealing plate and into which seed is deposited.

Different combinations of seed and fertilizer can be applied by replacing a cover plate on the shank with alternative forms of connection nipples or connectors. However, the use of multiple sealing plates one to pack material in immediately around the gaseous fertilizer and will also cover other fertilizer that may be added at an intermediate level and form a firm seed bed with members forming channels in moist soil assures that the single pass will provide as good a yield as possible and minimize losses of the fertilizer.

The concept shown in U.S. patent application Ser. No. 623,056, filed July 18, 1984, for forming individual furrows for placement of seed are utilized here for enhancing operation.

BRIEF DESCRIPTION OF THE DRAWINGS

FIG. 1 is a side elevational view of a typical shank assembly utilized with the device of the present invention;

FIG. 2 is a fragmentary enlarged side elevational view of the device of FIG. 1 showing it in a different operating mode;

FIG. 3 is a fragmentary perspective view of the lower end of the shank shown in FIG. 1;

FIG. 4 is a view of a typical insert used for permitting the application of seed, granular fertilizer or liquid fertilizer and anhydrous gas or other gaseous type fertilizers in one pass; and FIG. 5 is a fragmentary rear view of the lower portion of the device shown in FIG. 3.

DETAILED DESCRIPTION OF THE PREFERRED EMBODIMENTS

A grain drill and applicator shank illustrated generally at 10 is an assembly that is adapted to be mounted onto a suitable frame or tool bar 11 and includes a rearwardly extending beam 12 that is mounted on a pivot pin 13 to a clamp that is mounted on the frame 11. A spring trip control mechanism 14 of suitable and conventional design is used with the clamp for maintaining the shank assembly in the ground. The beam 12 has a vertically extended furrow opener shank 15 affixed to the rear of the beam. The furrow opener shank in the form shown is a rectangular cross section tube having two interior dividing walls that extend for the vertical length of the shank to divide the shank into three vertically extending passageways or chambers. As shown in FIG. 1, these dividing walls include a first wall 16 and a second wall 17. These walls divide the shank into a first chamber 20, a center or second chamber 21 and a third chamber 22 which is on the rear of the shank when the shank is being moved through the field in its normal direction of travel.

The shank 15 has a furrow opener point of suitable design indicated generally at 25 affixed to its lower end, which will run below the level of the ground at a desired depth and will open a central furrow. The furrow opening point 25 has a dividing edge 26 forming its leading edge and can be configured as desired to open an adequate furrow below the ground surface. Spaced apart side plates 27 are provided along the sides of the furrow opening point 25.

In the form shown in FIG. 1, an adaptor plate 30 is removably secured to the upper end of the shank tube 15 and includes a tubular input nipple 31 for receiving liquid or granular fertilizer from a source indicated generally at 32 and a second tubular nipple 33 for receiving seed from a source indicated at 35. The fertilizer source 32 is for granular fertilizer and the fertilizer will drop down through the passageway 21. When liquid fertilizer is to be used, a different adaptor plate is mounted, as will be shown.

At the rear of the shank tube 15 and at the lower end, there is a tapered guide wall 36 forming an extension of the wall 17. The guide wall leads to a pair of seed outlet tubes 37A and 37B, respectively, leading from passageway 22. A dividing edge 37C is provided for dividing seed in passageway 22, as can be seen in FIG. 5. This will divide the seed from the passageway 22 into two separate paths, so that the seed will come out through an outlet opening 37D from the tube 37A and 37E from the tube 37B.

Immediately below these tubes 37A and 37B is a sealer plate indicated generally at 39 which comprises a unitary cast plate having a recess that fits over the side plates 27 just to the rear of the opening point 25 and also to the rear, generally, of the outlet from the passageway 21. The plate 39 has a center surface 41 that is a flat surface and which tapers downwardly slightly in rearward direction as shown in FIG. 1.

Adjacent to the outer lateral sides of the sealer plate there are wedge shaped, furrow forming members 42 and 43, that extend downwardly from the surface 41 and which taper laterally outwardly and downwardly in the direction from the leading edges, to form furrows in the ground along the edges of the furrow formed by the shank. It should be noted that the edges of the plate 39 are wider than the shank itself so that the furrows formed by the members 42 and 43 are in fresh ground and will be opening little troughs for seed along the sides of the furrow formed by the shank to insure that if there is any moisture in the ground, there will be moist soil brought into the area formed by the wedge-shaped members 42 and 43 and into which the seed will drop.

Thus, when the seed comes down through the passageway 22, it will be deposited onto a seed bed formed by the sealer plate 39 and into the small furrows formed by the wedge shaped members 42 and 43.

The vertical passageway 21, as shown, has a bottom wall indicated generally at 45 which tapers rearwardly and downwardly and provides an outlet opening shown generally at 46 in FIG. 5. This is an outlet passageway so that when granular fertilizer is provided, it will come out below the sealer plate 39 utilized.

However, outlet opening 46 is above a lower sealer plate indicated generally at 50 that tapers outwardly from the shank below the intermediate or mid-level opening 46.

The adaptor plate 30, as shown also, has a tube 52 attached thereto which is connected to a suitable source of anhydrous gas indicated at 53. The tube 52 extends down through the passageway 20 and has a lower end indicated at 53 which has a suitable discharge aperture for gaseous fertilizer. Deposited gaseous fertilizer is indicated by the symbols shown at 55. The lower end 54 of the tube 52 is positioned below the sealer plate 50 and just behind the rear most edge of the opening point 25. The wall 16 is angled so that it comes very close to the back of the chisel point 25, but leaves enough of a passageway so that the tube 52 can pass to the exterior. It should also be noted that the end portion 54 which has a suitable opening for discharge of the gaseous fertilizer is just slightly above the lowermost edge indicated at 25A of the point 25.

It can be seen that as the shank moves along below the ground surface, the furrow opener and opener point open a narrow furrow bottom defined by the tapered surfaces 25B adjacent the lower edge 25A. Immediately behind the tapered surfaces 25B, the gaseous fertilizer indicated at 55 will be injected. The sealer plate 50 is immediately above and immediately to the rear of the end portion 54 of the tube 52 so that the gaseous fertilizer is immediately sealed into the ground by dirt that is packed in around the bottom of the furrow and covers the gas.

The outer edge portions 57 of sealer plate 50 taper outwardly in rearward direction as shown in FIGS. 3 and 5 in particular. The width of the sealer plate 50 is such that it moves material from the sides of the furrow down into the lower portion of the furrow opening formed by the tapered surfaces 25B of the point 25, and it quickly, and adequately seals the gaseous fertilizer and provides a covering over this gaseous fertilizer before it escapes. The plate 50 provides a dirt layer so that the fertilizer is less likely to cause frosting and freeze-up of the opening 46, for example, which is just above the gaseous fertilizer.

The outer edge portions 57 of the lower sealer plate 50, as shown, taper outwardly to form a good sealing member on the sides of the shank. A tapered wedge 58 is formed at the rear of plate 50 and has a lower edge that forms a small groove or furrow and packs dirt into the bottom of the main furrow.

The intermediate layer or level formed in the main furrow by the sealer plate 50 and the small furrow member 58 form a bed on which the granular fertilizer indicated by symbols 59 (FIG. 1) can fall, and the plate 39 forms two furrows on which seed, indicated at 60, can fall.

In the alternative embodiment shown in FIG. 2, a second adaptor plate shown at 63 is mounted and includes the connection nipple 33 for seed and the tube 52 in the same form as in FIG. 1, but further includes a tube 64 which is connected to a source of liquid fertilizer 65. Tube 64 extends through the passageway 21 of the shank 15 and has a bent end section that protrudes out through the opening 46 and deposits liquid fertilizer indicated generally at 66 at a level on the bed formed by plate 50 and member 58 over the gaseous fertilizer 55. Seed also then can be deposited in the same manner as before.

In FIG. 4, a further modified adaptor plate 70 is provided with a double nipple indicated at 71, one side of which can be connected to seed and one side of which can be connected to the granular fertilizer source. Tube 64 is provided for liquid fertilizer and the tube 52 is provided for gaseous fertilizer.

Prior attempts to place gaseous fertilizer in furrows have had problems because of inadequate and late sealing of the furrow, even though some shank units had sealer plates above the gaseous fertilizer for sealing. Prior devices were designed to place the granular fertilizer or liquid fertilizer at the same level as the gaseous fertilizer. The present device, however, has two sealing plates, one to provide a layer of dirt over the gaseous fertilizer, to immediately seal it, which is of importance, and a second plate provides an intermediate bed of dirt for liquid or granular fertilizer. The second sealer plate is used to cover over the liquid fertilizer or granular fertilizer deposited at a level below the seed. The second sealer plate also forms a firm seed bed with moist soil. This combination provides for a very effective minimum tillage seeding assembly.

The options available to the operator are substantially increased because the present device provides for a satisfactory way of injecting gaseous fertilizer, sealing it, injecting longer term granular or liquid fertilizer, sealing it with a separate sealing plate and then placing the seeds in moist soil before final covering by a covering press wheel or the like (not shown) which is conventional for closing a furrow. The present arrangement sows a paired row of seeds closely spaced (about three inches apart). The individual shank assemblies can be spaced approximately ten inches apart, which will leave a seven-inch gap between the closest rows. The shanks can be placed farther apart, if desired, depending on the conditions.

Although the present invention has been described with reference to preferred embodiments, workers skilled in the art will recognize that changes may be made in form and detail without departing from the spirit and scope of the invention.

What is claimed is:

1. A shank for opening a furrow comprising:

a tubular shank portion having a furrow opening point at a lower end thereof and in a leading position relative to the direction of travel, the shank having a width defining a furrow opening in the earth;

means for providing three uprightly extending passageways in said shank;

a first passageway in said shank comprising a tube carrying gaseous fertilizer material and being positioned immediately to the rear of the furrow opening point at the lowermost part of the furrow being formed, said tube having a first outlet opening at the lower end thereof;

a first sealer plate mounted on and extending laterally outwardly from and rearwardly from said shank immediately above the first outlet opening for said gaseous fertilizer material and to the rear thereof and inclining downwardly in rearward direction to cover the gaseous fertilizer with soil from the surfaces defining the furrow as the gaseous fertilizer material is discharged from the tube;

a second outlet opening leading from a second passageway of the shank immediately above said first sealer plate, said first sealer plate extending rearwardly from the first outlet opening for said gaseous fertilizer material and the second outlet opening being immediately to the rear of the first sealer plate;

a second sealer plate mounted on said shank above said second outlet opening and to the rear thereof with respect to the direction of travel, said second sealer plate extending laterally outward from the shank and being adapted to cover material discharging from said second outlet opening with soil from surfaces of the furrow formed by the shank, and having a tapered surface means for firmly packing soil to form a packed seed bed, said second sealer plate inclining downwardly in rearward direction; and a third of the passageways in said shank having a third outlet opening means for permitting seed to be discharged onto the packed seed bed to the rear of the second sealer plate and above the first and second outlet openings.

2. The apparatus as specified in claim 1 wherein said second outlet opening is connected to a second passageway extending vertically in said shank and a granular fertilizer source is connected to said second passageway.

3. The apparatus as specified in claim 1 wherein said second sealer plate has furrow forming members along the side edges thereof, that define small furrows laterally outwardly from side surfaces defining said shank, and said third outlet opening means comprising two tubes that direct a portion of the seed carried in the third passageway to each of the tubes forming the third outlet opening means and to thereby deposit a portion of the seed from the passageway into each of the furrows formed by the second sealer plate.

4. The apparatus of claim 3 wherein said first sealer plate has a lower surface and a wedge shaped member of narrower width than the lower surface and laterally centered on the first sealer plate and positioned at the rearward portions of said first sealer plate to form a groove in the soil packed by the lower surface of the first sealer plate into the lowermost portions of the furrow above the gaseous fertilizer, said groove providing a groove for placement of the granular material from the second outlet between the tubes comprising the third outlet.

* * * * *